D. H. YOUNG.
ELECTRIC HEATER FOR HUMIDIFIERS.
APPLICATION FILED FEB. 2, 1918.

1,294,015.

Patented Feb. 11, 1919.

Inventor,
D. H. Young, by
G. C. Kennedy,
Attorney.

UNITED STATES PATENT OFFICE.

DANIEL H. YOUNG, OF MANCHESTER, IOWA.

ELECTRIC HEATER FOR HUMIDIFIERS.

1,294,015. Specification of Letters Patent. Patented Feb. 11, 1919.

Application filed February 2, 1918. Serial No. 215,057.

*To all whom it may concern:*

Be it known that I, DANIEL H. YOUNG, a citizen of the United States of America, and a resident of Manchester, Delaware county, Iowa, have invented certain new and useful Improvements in Electric Heaters for Humidifiers, of which the following is a specification.

My invention relates to electric heaters for humidifiers, and the object of my improvement is to supply means for generating and supplying vaporous steam to the atmosphere surrounding the appaartus, or a mixture of steam and electrolytically separated gases derived from water molecules acted upon by the apparatus, the electric heating-means being of a simple yet most effective form for generating such steam or gases in an electrically conductive vessel.

Figure 1:
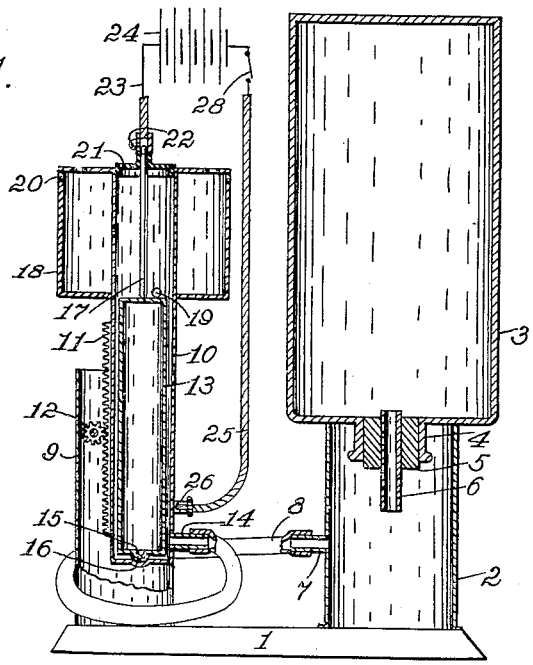
Figure 2:
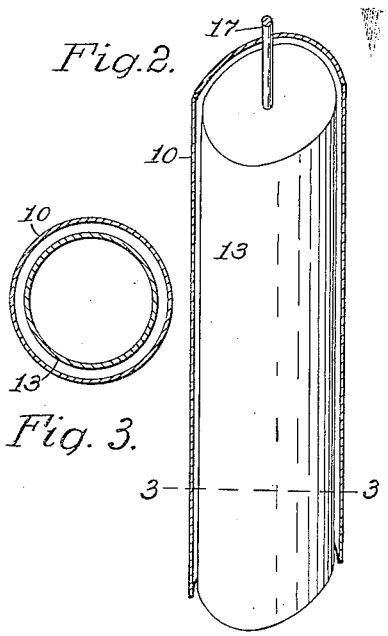
Figure 3:
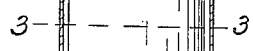

This object I have accomplished by the means which are hereinafter described and claimed, and which are illustrated in the accompanying drawings, in which Figure 1 is a medial vertical longitudinal section taken through my said apparatus; Fig. 2 is a perspective detail view, on a magnified scale, of the boiler and the hollow electrode therein, parts of the boiler being sectioned away; and Fig. 3 is a horizontal section of the parts shown in said Fig. 2, taken on the broken line 3—3 thereof.

Similar numerals of reference denote corresponding parts throughout the several views.

My improved humidifying apparatus is designed to supply steam or a mixture of steam and electrolytically separated oxygen gas to an inclosed chamber or room, or any other inclosure, such as a show-case, compartment or the like, where it is considered desirable to supply the air therein with a proper degree of humidity, or to conserve the health of occupants of buildings, such as school-rooms, hotels or other erections.

The apparatus comprises an inverted bottle or supply-vessel 3, whose neck 4 is pendant and closed by a cork 5, the latter orificed to receive a short tube 6 whose lower end extends a short ways below said neck and delivers water from said vessel, as controlled by a vacuum in the upper part thereof into a receptacle 2 fixed on a base 1 and having a laterally-directed nipple 7 delivering into one end of a flexible tube 8.

The numeral 9 denotes a hollow casing, of a tubular shape, split throughout its length vertically facing the vessel 3, and fixed on the other end of said base 1. The casing is of cylindrical form open at the top, and having on its side farthest from said vessel 3 a rectangular lateral extension with orificed side walls to receive the ends of a rotatable shaft having fixed thereon within the casing extension a small gear-wheel 12.

A cylindrical hollow vessel or boiler 10 loosely fits within the cylindrical part of said casing to slide up and down vertically therein, and has a nipple 14 inserted within the other end of the flexible tube 8, said nipple being movable through the split in the side of the casing. A toothed rack is fixed vertically on said boiler 10 to extend into its lateral extension and is in mesh with the gear-wheel 12. A hollow cylindrical chamber 18, of a larger diameter, is fixed concentrically about the upper part of the boiler 10, with closed top and bottom, but being in communication with the boiler by means of orifices 19, while said chamber has near its upper end steam exit-ports 20 extending laterally.

Within said boiler is a relatively large hollow cylindrical electrode 13, closed at top and bottom and carried on the lower end of a conductor-rod 17. On the bottom of said electrode a glass or porcelain knob 15 is fixed receivable detachably into a hollow or socket 16 in the bottom of the boiler, to support the electrode, while insulating it from the boiler, and preventing displacement of the electrode to either side.

The upper end of the conductor-rod 17 extends upwardly from the boiler through a centrally-orificed insulating closure 21, and into connection with a conductor 23 held by a set-screw 22. One end of another conductor section 25 is connected to a boss 26 on the outer surface of said boiler, said boss also extending through said split in said casing 9. The conductor-sections 23 and 25 are in circuit with a source of electrical current 24, and said circuit is also provided with a make-and-break device at 28.

When the vessel 3 is filled with water and then inverted, as shown, it delivers water to a certain level in the container 2 determined by the height of the port 6, the water being delivered thence through the tube 8 into said boiler 10. The gear-wheel may be rotated by means of a thumb-disk on the shaft (not shown) to move the boiler vertically up or down in said casing, to more or less submerge the electrode 13 as the water level in said boiler is varied by said action. The circuit being closed through said boiler and the water therein, the water is soon brought to boiling-point and generates steam, which passes into the chamber 18, and thence passes laterally into the surrounding atmosphere through the ports 20. It will be seen that the circuit is completed from the electrode 13 and the boiler 10, the latter being made of conducting material, and it is believed that the form of the electrode exercises a large effect upon the rapid generation of steam. This is due to the relatively large exterior surface of the electrode, and its being spaced narrowly from the concentric inner wall of the conductive boiler 10, so that the electrical current can permeate the thin layer of water in the boiler between the electrode and the boiler surface in all parts.

The forms of the electrode and the boiler may be varied as desired in other ways to increase the effectiveness of the apparatus, without departing from the principle of my invention. The provision of a heating circuit of the kind shown, wherein but a single electrode is used and the return current closed through the boiler itself, makes the device simple in construction, easily assembled or disassembled without danger while separating the parts, and generates more steam in a given length of time than would be the case if the electrodes were used as a pair inserted in the boiler, and the circuit closed through the electrodes only.

My improved electric heating device may have its boiler and electrode differently formed and arranged, that is in a horizontal or other position, if desired, and with different superficial configurations so as to co-act in the way and for the purposes mentioned, without departing from the principles of my invention. The concentric chamber 18 may have differently arranged ports, or may be opened at the top, since its special function is to retain boiling water which may be forced up above the electrode 13 while boiling, to return same to the boiler by way of the orifices 19, and also to give freer vent for and give direction to the steam generated. The electrical current may be alternating, such as is derived from the commonly used 110 volt circuit of an alternating generator.

Having described my invention, what I claim as new, and desire to secure by Letters Patent, is:

1. In a humidifier, a hollow vessel having an open top, a closure for said open top, an outer closed chamber positioned around the upper part only of said vessel and in occasional communication therewith at its bottom only, said chamber having an exit-port in its upper part, and heating-means positioned within said vessel.

2. In a humidifier, a hollow electrically-conductive vessel having an open top, an insulating closure for said open top, a hollow inclosure about said open top in occasional communication at its bottom with said vessel and with the atmosphere at its upper part, and an electrode within said vessel insulated and spaced therefrom having a conductor passed through and supported by said insulated closure.

Signed at Waterloo, Iowa, this 16th day of January, 1918.

DANIEL H. YOUNG.